Patented Aug. 27, 1929.

1,726,451

UNITED STATES PATENT OFFICE.

JACOB POHLMANN AND JACOBUS RENARDUS FREDERIK RASSERS, OF LEIDEN, NETHERLANDS.

PROCESS FOR REMOVING ALBUMINOUS SUBSTANCES FROM SACCHARINE JUICES, INCLUDING MOLASSES.

No Drawing. Application filed March 13, 1928, Serial No. 261,407, and in the Netherlands March 15, 1927.

Our invention relates to an improved process for removing albuminous substances from saccharine juices including molasses which consists in adding to the non-alkaline saccharine juice at normal temperature a suitable quantity of a non-alkaline substance which has the property to precipitate the ferment-albumens, and separating the precipitate from the juice.

The exact quantity of the ferment-albumens precipitating substance necessary for precipitation may be easily determined by laboratory experiment.

Or, according to another embodiment of our invention, also an excess of a non-alkaline substance which has the property to precipitate the ferment-albumens may be added to the saccharine juice which excess is then subsequently removed by precipitation with slacked lime; after separation of this second precipitate from the juice its lime contents is removed by means of carbonic acid and finally the precipitated calcium carbonate separated from the juice.

According to our invention tannin, its derivatives and compounds (in so far as they form by decomposition during the treatment tannin) phosphoric-tungstenic-acid, phosphoric-molybdenic-acid, methyl-alcohol, picric-acid, etc. may be used as neutral or acid substances which possess the property to precipitate the ferment albumens in neutral or acid saccharine juices.

In the manufacture of sugar it has always been aimed at to remove the albuminous substances from the raw juice. After the diffusion plants had been invented and generally introduced into practice the prevailing idea was that such albuminous substances were entirely eliminated, which was quite apprehensible in view of the temperature at which the diffusion was effected and of the small degree of acidity of the juices.

It was however overlooked that the ferment-albumens which constitute the inactive residues of the previously active ferments had not been precipitated, said substances remaining in solution during the treatment in the diffusion plants, which solution resists all operations in the sugar manufactory, so that they may even be found again dissolved in the molasses. Those albuminous substances constitute protecting colloids which impede the crystallization of the sugar, upon which perception the invention is based.

It is rather clear that such impeding influence is caused by said ferment-albumens since these are present in a sufficient quantity. The sugar beet has as biennial plant a need for ferments which enable it 1: to synthetically build up the saccharose during its first year of life; 2: to use its reserved food—brought into a useful condition—for the production of seeds during its winter sleep and its second year of life. Therefore it is not astonishing that the raw juice including the diffusion juice contains a large percentage of ferment-albumens. The same applies to sugar cane, arenga palm, etc. Therefore the process according to our invention may also be applied to juices obtained from said plants and moreover in sugar refineries and everywhere where sugar solutions of vegetable origin are treated.

That this simple solution of the problem has escaped the attention of so many investigators, who tried to find a chemical solution concerning the problem of bad crystallization of the molasses is due to the ignorance of said investigators of the deviating properties of said ferment-albumens, which has been called by us "small albumens" considering the data known from the physiological chemistry it becomes clear that with the usual operations in the sugar industry there can be no question about the precipitation of those ferment-albumens, in contradistinction to the "big albumens" which are removed from the material by the diffusion and subsequent treatment with lime.

As an example pepsin, the albumen-decomposing ferment from the stomach of mammals, is mentioned; neither heating in aqueous solution even to the boiling point nor a subsequent treatment with lime are adapted to precipitate the pepsin from its solution. The same applies to the proteolytic ferment of the pancreas, trypsin, and all other ferments to wit also those occurring in the sugar beet, the sugar cane and other plants.

However the pepsin—and the ferment-albumens generally—is precipitated by addition of tannin, picric acid, etc. in a weak acid medium, as is known in physiological chemistry.

Said chemicals have previously partially been applied in the sugar industry in alkaline solution e. g. calcium tannate and tannin. However we have experienced that it is quite wrong to use tannin in connection with alkaline juices. For in an alkaline medium the ferment-albumens are not precipitated. This most certainly appears from the fact that a precipitate of the said ferment-albumens, formed according to the process of our invention in a weak acid medium is entirely dissolved upon addition of $Ca(OH)_2$ to an alkalinity of 2/100 N. Only a slight turbidity remains due to the calcium compounds of albumen dissolved through carbonation, the solubility thereof being yet increased by the introduction of $CO_2$.

According to our invention it is necessary to operate with acid or exactly neutral juices. It may be that a possible inversion of the acid juice which is generally apprehended in the sugar industry formed a bar against the application of this method. We, however, have just seen the importance of our process, which may be applied to the purification of raw juice, weak juice and strong juice as well as especially to that of cane and beet-molasses.

In contradistinction to the above mentioned known methods the improved process is operated at normal temperature, so that the danger of inversion is reduced to a minimum.

The removal of the ferment-albumens from saccharine juices gives the following advantages:

The crystallization is promoted resulting in a higher yield of sugar and a reduction of the quantity of molasses. Also the molasses may be either again caused to crystallize or used as treacle for consumption, after their bad taste has been taken off.

The process according to our invention will now be elucidated by the following example:

100 kg. of cane or beet molasses are diluted with the three-fold quantity of water and 1 litre of phosphoric acid is added for acidification. Subsequently 1.75 kg. of tannin dissolved in a small quantity of water is added whereupon a voluminous precipitate is formed and separated from the liquid by filtration. To be sure that a sufficient quantity of tannin has been added the filtrate is tested with a solution of ferric chloride.

For removing the excess of tannin from the filtrate slacked lime is added, resulting in the formation of a precipitate of calcium tannate, which is again separated by filtration. All these operations may be performed at normal temperature. To remove the excess of the added lime carbonic acid is passed through the liquid which preferably may be slightly heated to about 50° C. The so formed precipitate of calcium carbonate is removed by filtration and the filtrate concentrated by evaporation until it has obtained the consistency of sirup and caused to crystallize. The treatment with lime gives the advantage that besides the excess of tannic acid, also tannin-iron compounds, which might be formed, are removed.

A few laboratory experiments suffice to determine the quantity of the tannin or of the other ferment-albumens precipitating means to be used.

We claim:

1. A process for removing albuminous substances from saccharine juices including molasses consisting in adding to the non-alkaline saccharine juice at normal temperature a suitable quantity of a non-alkaline substance which has the property to precipitate the ferment-albumens and separating the precipitate from the juice.

2. A process for removing albuminous substances from saccharine juices including molasses, consisting in adding to the non-alkaline saccharine juice at normal temperature an excess of a non-alkaline substance which has the property to precipitate the ferment-albumens, removing the precipitate formed, subsequently removing the excess of the said non-alkaline substance by precipitation with slacked lime, separating this second precipitate from the juice, precipitating the lime content of the juice by means of carbonic acid, and separating the precipitated calcium carbonate from the juice.

3. A process for obtaining sugar from molasses consisting in diluting the molasses with about the threefold quantity of water, acidifying the diluted molasses, adding thereto at normal temperature a suitable quantity of a non-alkaline substance which has the property to precipitate the ferment-albumens, separating the precipitate from the saccharine juice, concentrating the obtained juice to sirup consistency, and causing said juice to crystallize.

4. A process for obtaining sugar from molasses consisting in diluting the molasses with about the threefold quantity of water, acidifying the diluted molasses, adding thereto at normal temperature an excess of a non-alkaline substance which has the property to precipitate the ferment-albumens, removing the precipitate formed, subsequently removing the excess of the said alkaline substance by precipitation with slacked lime, separating this second precipitate from the saccharine juice, precipitating the lime content of the latter by means of carbonic acid, separating the precipitated calcium carbonate from the juice, concentrating the obtained juice to sirup consistency and causing said juice to crystallize.

5. A process for preparing treacle for consumption from molasses consisting in diluting the molasses with about the threefold quantity of water, acidifying the diluted molasses, adding thereto at normal temperature a suitable quantity of a non-alkaline substance which has the property to precipitate the ferment-albumens, separating the precipitate from the diluted molasses, and concentrating the obtained juice to sirup consistency, by evaporation.

6. A process for preparing treacle for consumption from molasses consisting in diluting the molasses with about the threefold quantity of water, acidifying the diluted molasses, adding thereto at normal temperature an excess of a non-alkaline substance which has the property to precipitate the ferment-albumens, removing the precipitate formed, subsequently removing the excess of the said substance by precipitation with slacked lime, separating this second precipitate from the molasses, precipitating the lime content of the latter by means of carbonic acid, separating the precipitated calcium carbonate from the molasses and concentrating the obtained juice to sirup consistency by evaporation.

In testimony whereof we affix our signatures.

Dr. JACOB POHLMANN.
Dr. JACOBUS RENARDUS FREDERIK RASSERS